United States Patent
Rückl et al.

(10) Patent No.: US 7,752,344 B2
(45) Date of Patent: Jul. 6, 2010

(54) PARAMETERIZATION DEVICE AND METHOD FOR PARAMETERIZING ELECTRICAL DEVICES

(75) Inventors: Uwe Rückl, Berlin (DE); Oliver Schrödel, Schnaittach (DE)

(73) Assignee: Siemens Aktiengesellschaft, Munich (DE)

( * ) Notice: Subject to any disclaimer, the term of this patent is extended or adjusted under 35 U.S.C. 154(b) by 217 days.

(21) Appl. No.: 11/916,368

(22) PCT Filed: Jun. 1, 2005

(86) PCT No.: PCT/DE2005/001005

§ 371 (c)(1),
(2), (4) Date: Jan. 2, 2008

(87) PCT Pub. No.: WO2006/128395

PCT Pub. Date: Dec. 7, 2006

(65) Prior Publication Data

US 2008/0201124 A1    Aug. 21, 2008

(51) Int. Cl.
*G06F 3/00* (2006.01)
*G06F 3/01* (2006.01)
(52) U.S. Cl. .......................................... 710/8; 710/15
(58) Field of Classification Search .................... 710/8, 710/15
See application file for complete search history.

(56) References Cited

U.S. PATENT DOCUMENTS

| 2004/0107009 A1* | 6/2004 | Fehrer et al. ............... 700/2 |
| 2005/0071463 A1* | 3/2005 | Bodin et al. ............... 709/224 |

* cited by examiner

*Primary Examiner*—Henry W. H. Tsai
*Assistant Examiner*—Hyun Nam
(74) *Attorney, Agent, or Firm*—Laurence A. Greenberg; Werner H. Stemer; Ralph E. Locher

(57) ABSTRACT

The invention is based on the object of specifying a parameterization device which is particularly user-friendly and which makes it possible to parameterize electrical devices with little expenditure of time and therefore in a particularly cost-effective manner. This object is achieved according to the invention by a parameterization device for generating parameterization signals determining device-specific operating parameters for one or more electrical devices of an electrical arrangement, having an input device, to which operating functions desired on the part of the user for the individual devices can be input independently of the device, having a memory device, in which a large number of electrical devices are recorded with their operating functions and their respective device-specific operating parameters, a processing device, which evaluates the operating functions input on the part of the user and reads a list of all those devices which fulfil the operating functions desired on the part of the user from the memory device, an output device, by means of which the list is supplied to the user for the purpose of selecting the device, and a signal generation device, which generates, for each device selected on the part of the user, in each case those parameterization signals which correspond to the operating parameters stored in the memory device.

6 Claims, 1 Drawing Sheet

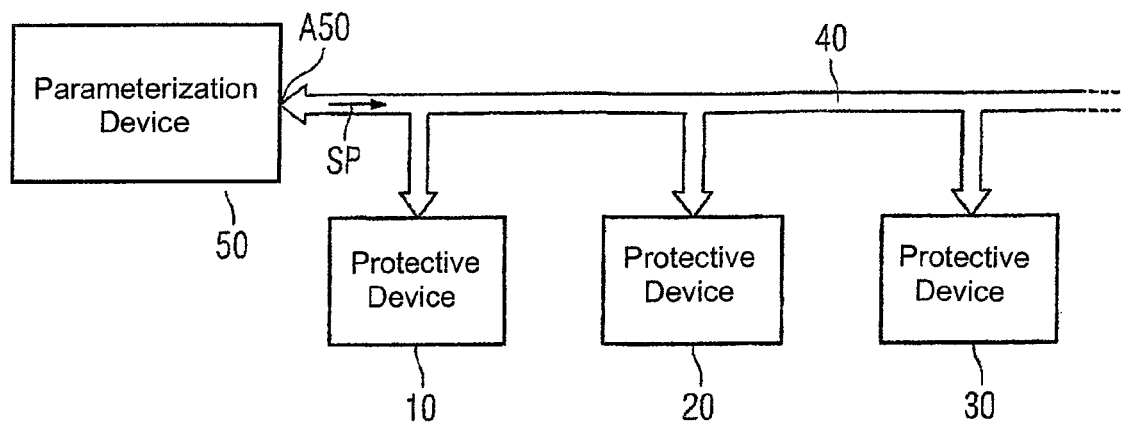
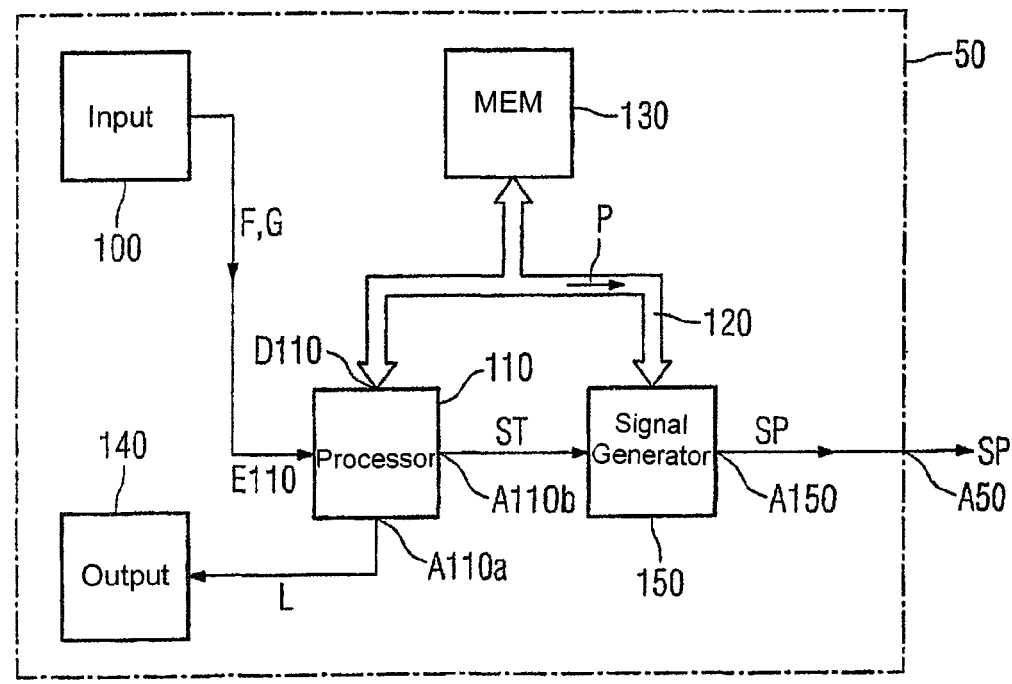

PARAMETERIZATION DEVICE AND METHOD FOR PARAMETERIZING ELECTRICAL DEVICES

BACKGROUND OF THE INVENTION

Field of the Invention

The invention relates to a parameterization device for generating parameterization signals, which define device-specific operating parameters, for one or more electrical devices of an electrical arrangement. The term "parameterize" is understood below as meaning the operation of inputting predefined operating parameters to electrical devices, the operating parameters defining the method of operation or the functional scope of the devices; the operating parameters are input with the aid of parameterization signals which transmit the operating parameters to the devices.

Commercial planning and parameterization aids are available nowadays for planning and designing electrical arrangements, for example complex electrical systems such as electrical station control systems, and for parameterizing individual devices of such electrical arrangements, for example protective devices. One known parameterization aid (also referred to as a "parameterization tool" in technical terminology) is formed, for example, by the DIGSI parameterization program from Siemens AG; after being started up in a data processing system, the DIGSI parameterization program forms a parameterization device.

In the case of this previously known parameterization tool, the operator must first of all specifically define the devices (that is to say, for example, the device type, the device version, the device equipment) which are intended to be used to construct the electrical system and are accordingly intended to be parameterized; for this purpose, the person operating the parameterization tool must first of all select all devices to be parameterized from a very large device catalog which sometimes has more than a hundred suitable devices. The actual parameterization, that is to say the stipulation of specific device parameters, can only be begun after the specific devices have been selected. If the person using the parameterization tool determines during his work that he selected an incorrect device at the beginning, which device cannot be used to perform the desired functions or cannot be used to set the desired operating parameters or does not have the quantity structure originally assumed by the user or does not have the performance originally assumed by the user, he must select a new device instead of the previously selected device and start inputting the desired operating parameters again.

BRIEF SUMMARY OF THE INVENTION

The invention is based on the object of specifying a parameterization device which is particularly user-friendly and makes it possible to parameterize electrical devices in a very short space of time and therefore in a particularly cost-effective manner.

According to the invention, this object is achieved by means of a parameterization device having the features as claimed in claim 1.

According to this, the invention provides a parameterization device having an input device to which operating functions which are desired by the user can be input for the individual devices in a manner independent of the devices. There is also a memory device which records a multiplicity of electrical devices with their operating functions and their device-specific operating parameters. A processing device is used to evaluate the operating functions which have been input by the user and to read a list containing all those devices which perform the operating functions desired by the user from the memory device. An output device is used to supply the list to the user for the purpose of selecting the devices. A signal generating device is used to respectively generate those parameterization signals which correspond to the operating parameters stored in the memory device for each device selected by the user.

One fundamental advantage of the parameterization device according to the invention can be seen in the fact that, in this device, the order of parameterization steps is virtually inverted with respect to the prior art explained and an incorrect device selection and a useless parameter input thus cannot result: This is because the input device of the parameterization device according to the invention makes it possible to input operating functions desired by the user in a form that is independent of the device; this means that only device-independent functions, for example protective functions (distance protection, differential protection etc.), input and/or output functions, number of inputs and outputs etc., are defined instead of specific device-specific operating parameters. The operation of inputting the desired functions can be concluded even before specific electrical devices, for example protective devices or the like, have been selected by the user; this procedure is made possible by the memory device, which stores the functions which have been input in a manner independent of the device, and by the processing device which processes the functions which have been input further. Only after all desired functions have been input does the parameterization device according to the invention request the definition of respective specific devices to be parameterized; for this purpose, the processing device creates a list of all those devices which are suitable for performing or satisfying the functions or operating parameters desired by the user. The corresponding list is supplied to the user by the output device of the parameterization device according to the invention, for example on a screen or in another form, with the result that the user can select only those devices which are suitable for the desired applications. An incorrect device selection and thus an associated useless parameter input therefore cannot result in the parameterization device according to the invention. Only after the desired devices have been selected is the "actual" parameterization carried out automatically by the signal generating device by virtue of the latter generating the device-specific parameterization signals on the basis of the device-independent operating functions which have been input and on the basis of the respectively selected devices.

Another fundamental advantage of the invention can be seen in the fact that the "hardware", that is to say the devices of the electrical arrangement which are used, can be very easily replaced, for example if the demands imposed on the arrangement change: If, for example, a device is replaced, the parameterization of the new device is automatically induced by the parameterization device according to the invention, after it has been selected by the user, by resorting to the device-independent operating functions which have been input by the user. For example, a protective device having eight binary inputs/outputs can be expanded in this manner without problems to 16 binary inputs/outputs, the remaining functions simply being assumed unchanged; as already explained, the signal generating device of the parameterization device then generates the specific parameterization signals.

A third fundamental advantage of the invention is that the demands imposed on the devices of the arrangement can also be subsequently modified in a very simple manner: If, for example, functions of the devices which have already been parameterized are intended to be omitted or added, only the changes in functions need to be input by the user; if it is possible, following such a change in function, to reselect more suitable or more cost-effective devices than before (for example when previously defined operating functions are omitted), this can be automatically induced, for example, by the parameterization device according to the invention using the processing device without precautions having to be taken by the user in this respect. If a substitute device is subsequently used, this new device is automatically parameterized—as explained—by the signal generating device by resorting to the operating functions which have been input.

The device-specific parameterization signals can be directly transmitted to the devices if they are already connected to the parameterization device; alternatively, the parameterization signals may also be initially buffer-stored and forwarded to the respective device for its parameterization at a later point in time. It is also conceivable that the parameterization signals are generated by the signal generating device only when the devices to be parameterized are connected to the arrangement.

The device-independent operating functions are preferably input by means of a selection of predefined application-specific solutions or standard functions which have to be already provided by the parameterization device and only have to be selected by the user.

The invention can be used, for example, in station control systems which are equipped with a plurality of field devices, for example protective devices. For example, the parameterization device according to the invention is connected to at least one of the field or protective devices in such a case, said parameterization device using its signal generating device to generate the parameterization signals and feed them into the field or protective device.

The invention also relates to a method for generating parameterization signals, which define device-specific operating parameters, for one or more electrical devices.

In order to achieve a particularly high level of user-friendliness in such a method and to make it possible to parameterize electrical devices in the shortest possible space of time, the invention proposes a method in which operating functions which are desired by the user are input for the individual devices in a manner independent of the devices, the operating functions which have been input by the user are evaluated by reading a list containing all those devices which perform the operating functions desired by the user from a memory device which records a multiplicity of electrical devices with their operating functions and their device-specific operating parameters, the list is supplied to the user for the purpose of selecting the devices, and those parameterization signals which correspond to the operating parameters stored in the memory device are respectively generated for each device selected by the user.

As regards the advantages of the method according to the invention, reference is made to the above statements in connection with the parameterization device according to the invention.

Before the list is supplied to the user, the list is preferably filtered or sorted in accordance with criteria predefined by the user. For example, the sorting or filtering operation is carried out on the basis of device costs.

The invention is explained below with reference to an exemplary embodiment. In the drawing

BRIEF DESCRIPTION OF THE SEVERAL VIEWS OF THE DRAWING

FIG. 1 shows an exemplary embodiment of a station control system according to the invention having a plurality of protective devices and a parameterization device according to the invention which is connected to the latter, and FIG. 2 shows an exemplary embodiment of the specific design of the parameterization device according to FIG. 1.

DESCRIPTION OF THE INVENTION

Three protective devices 10, 20 and 30 which belong to a station control system (not illustrated any further in FIG. 1) can be seen in FIG. 1. The three protective devices 10, 20 and 30 are connected to a parameterization device 50 by means of an external data bus 40. The parameterization device 50 is used to generate parameterization signals SP and to transmit them to the three protective devices 10, 20 and 30. The parameterization signals SP are used to define or set the specific method of operation of the protective devices 10, 20 and 30.

The specific design of the parameterization device 50 according to FIG. 1 is shown in FIG. 2. It can be seen that the parameterization device 50 has an input device 100 which is connected to an input E110 of a processing device 110. The processing device 110 is connected, by means of a data connection D110, to an internal data bus 120 which is connected to a memory device 130.

The processing device 110 is also connected to an output device 140 and to a signal generating device 150 by means of an output A110a and a further output A110b. An output A150 of the signal generating device 150 forms the output A50 of the parameterization device 50, which is connected to the external data bus 40 according to FIG. 1.

The method of operation of the arrangement according to FIG. 1 and the method of operation of the parameterization device 50 according to FIG. 2 are explained in detail below:

The station control system according to FIG. 1 is first of all planned and designed using the parameterization device 50. During this planning and design operation, the input device 100 is used to define the operating functions desired by the protective devices 10 to 30. In this case, the operating functions F are input in a manner independent of the devices; this means that the operating functions F are also input in a manner independent of the specific selection of the individual protective devices 10 to 30 and only the respective intended "basic function" of the protective devices 10 to 30 is defined. Device-independent operating functions may be defined, for example, by the protective functions themselves, the input/output functions or other functions. For example, the protective function may define whether it is a differential protective device or a distance protective device or the like.

After the operating functions desired by the user have been input, the operating functions which have been input are processed further in the processing device 110. To this end, the processing device 110 compares the operating functions which have been input with operating functions stored in the memory device 130. For this comparison, the operating functions which have been input by the user are transmitted, via the internal data bus 120, to the memory device 130 and are aligned there with the stored data records.

For this purpose, the memory device 130 stores different devices, in particular protective devices, with their operating functions and additionally with their device-specific operating parameters which must be set in order to start up the respective operating functions. As a result of the data alignment described, the processing device 110 determines which of the devices stored in the memory device 130 are, in principle, able to perform the operating functions desired by the user. All of the suitable devices are compiled in a list L and are indicated to the user using the output device 140 which may be, for example, a monitor or the like. The person using the parameterization device 50 now has the opportunity to select the respectively desired device from the list.

The user will preferably select the respective most cost-effective device in order to ensure that the station control system according to FIG. 1 will be implemented as cost-effectively as possible. In order to simplify selection of the protective devices 10 to 30 on the basis of aspects of costs, the list containing the suitable protective devices may be sorted, for example on the basis of aspects of costs, in such a manner that the suitable, particularly cost-effective devices are listed first and more expensive devices are only listed afterward. Alternatively, devices or device classes can be prioritized or filtered on the basis of customer stipulations (customer-specific preferred devices or preferred classes).

As soon as the user has used the input device 100 to select the desired protective devices 10 to 30 using input signals G, the protective devices 10 to 30 can be parameterized. To this end, the processing device 110 drives the signal generating device 150 using control signals ST. As soon as the signal generating device 150 receives the control signals ST, it generates the required parameterization signals SP which give rise to the desired operating functions for the selected devices. In this case, the parameterization signals SP are generated in the signal generating device 150 using the memory device 130 which stores the device-specific operating parameters P for each device on the basis of the respectively available operating functions of the respective device. In order to enable a data connection between the signal generating device 150 and the memory device 130, the signal generating device 150 is likewise connected to the internal data bus 120.

In order to input the operating functions desired by the user in a particularly simple manner, the input device 100 is preferably configured in such a manner that it makes it possible to input the operating functions by means of a selection of predefined application-specific solutions; this means, for example, that selectable operating functions are offered to the user using pull-down menus or the like, with the result that the user must merely make a selection. A selection of predefined solutions which is prepared in this manner affords the advantage that incorrect definition of functions by the user is avoided in a very reliable manner.

LIST OF REFERENCE SYMBOLS

10 Protective device
20 Protective device
30 Protective device
40 External data bus
50 Parameterization device
100 Input device
110 Processing device
120 Internal data bus
130 Memory device
140 Output device
150 Signal generating device
G Input signals
L List
F Operating functions
P Operating parameters

The invention claimed is:

1. A parameterization device for generating parameterization signals, defining device-specific operating parameters, for an electrical device or a plurality of electrical devices of an electrical installation, the parameterization device comprising:
   an input unit for inputting user-desired operating functions for the electrical device or the plurality of electrical devices independently of the electrical device or the plurality of electrical devices, wherein said input unit is configured to render possible an input of device-independent operating functions by way of a selection of predefined application-specific standard functions;
   a memory for storing a multiplicity of electrical devices with their operating functions and their device-specific operating parameters;
   a processor connected to said input unit and to said memory, said processor evaluating the user-desired operating functions input by a user and reading a list from said memory containing all devices of the plurality of electrical devices performing the user-desired operating functions;
   an output unit configured to provide the list to the user for selecting an electrical device from the plurality of electrical devices; and
   a signal generator configured to respectively generate parameterization signals corresponding to the operating parameters stored in the memory for each device selected by the user.

2. A station control system, comprising:
   a plurality of field devices;
   a parameterization device according to claim 1 connected to at least one of said field devices, said parameterization device using a signal generator thereof to read device-specific operating parameters of the respectively connected said field device from said memory, to generate the corresponding parameterization signals using the operating parameters and to feed the parameterization signals into the respective said field device.

3. The station control system according to claim 2, wherein said field devices are protective devices.

4. A method of generating parameterization signals, the method which comprises:
   defining device-specific operating parameters, for one or more electrical devices of an electrical installation, by
   inputting user-desired operating functions for the electrical device or plurality of electrical devices independently of the electrical device or the plurality of electrical devices and selectively inputting device-independent operating functions by way of selection of predefined application-specific standard functions;
   evaluating the operating functions input by the user by reading a list containing all those devices which perform the user-desired operating functions from a memory holding a multiplicity of electrical devices with their operating functions and their device-specific operating parameters;

supplying the list to the user for the purpose of selecting the devices;

generating those parameterization signals that correspond to the operating parameters stored in the memory for each device selected by the user, and using the parameterization signals for parameterizing field devices or protective devices of a station control system.

5. The method according to claim 4, which comprises, prior to supplying the list to the user, filtering and sorting the list in accordance with criteria predefined by the user.

6. The method according to claim 5, which comprises sorting or filtering based on a device cost.

* * * * *